United States Patent [19]

Aul et al.

[11] 3,922,498

[45] Nov. 25, 1975

[54] AUTOMATIC CALLING LINE IDENTIFICATION ARRANGEMENT

[75] Inventors: Guy Darrell Aul, Niles; James Russell Ballard; Roger Alan Fraser, both of Wheaton, all of Ill.

[73] Assignee: Bell Telephone Laboratories, Incorporated, Murray Hill, N.J.

[22] Filed: May 1, 1974

[21] Appl. No.: 465,770

[52] U.S. Cl. .......... 179/17 A; 179/8.5; 179/27 DA; 179/27 DB; 179/27 E

[51] Int. Cl.$^2$ .......... H04Q 5/02

[58] Field of Search .......... 179/17 A, 18 FH, 27 DB, 179/8.5, 27 DA, 27 E, 18 D

[56] References Cited

UNITED STATES PATENTS 3,760,112 9/1973 Busch .......... 179/17 A

*Primary Examiner*—Kathleen H. Claffy
*Assistant Examiner*—C. T. Bartz
*Attorney, Agent, or Firm*—D. M. Duft

[57] ABSTRACT

An arrangement for identifying a calling party is disclosed. A service request from a calling line causes identification circuitry to be arranged to identify the directory number of the subscriber on an individual party line or to initially identify the directory number of the ring party on any two-party line. An identifying signal applied to the calling line's sleeve lead results in the directory number identification and the class of service of the calling line being stored in an outpulser circuit. The outpulser then conducts a two-party test on the calling line to determine whether the tip or the ring party initiated the call if the class of service indicates that the calling line is a two-party line. A ring party determination results in the stored identification being used; a tip party determination results in the stored identification being erased and a tip party identification being conducted.

10 Claims, 2 Drawing Figures

AUTOMATIC CALLING LINE IDENTIFICATION ARRANGEMENT

BACKGROUND OF THE INVENTION

This invention relates to telephone systems and, more particularly, to such systems wherein means are provided for automatically identifying the telephone number corresponding to a calling party.

DESCRIPTION OF THE PRIOR ART

The rapid growth of the telephone system has been recently accompanied by a corresponding rapid growth in the development of calling number identification systems. Previously, special service calls such as long distance and other toll calls required an operator to determine the number of the calling party. As can be expected, the intervention of an operator in a call sequence requires additional time, is expensive and, furthermore, it has been estimated that with the rapid rate of increased long distance calling there would not be sufficient operators to adequately handle these calls. Thus equipment arrangements were developed to automatically determine the telephone number of a calling party.

Automatic Number Identification, ANI, systems such as that described in U.S. Pat. No. 3,243,514, issued to Moore et al on Mar. 29, 1966, were introduced into the telephone switching system in order to automatically determine the telephone number of a calling party. The Moore et al arrangement comprises identification circuitry associated with each subscriber's line which, when activated, operates to identify the telephone directory number of the calling line.

This system, although wholly satisfactory for the purpose for which it was developed, is only economically applicable to telephone offices which serve approximately 5,000 or more subscribers. In smaller telephone offices, the Moore et al system is too expensive on a per-line basis; and these small offices still require operator intervention on most toll calls.

Recently ANI arrangements have been introduced for use with small offices and such arrangements typically are modifications of the Moore et al arrangement described above. One such modification involves two-party test equipment associated with the ANI arrangement. In the Moore arrangement, the two-party test equipment is located with the ANI trunk equipment on a one-per-one basis. The modified arrangement has the two-party test equipment located in the outpulser circuit and since each telephone office has at most only two outpulser circuits, this modification has achieved economies in cost and equipment space. However, the modified arrangement performs a two-party test on all calls regardless of whether they have originated on lines serving individual parties or two-party lines, and thus the system wastes valuable outpulser time. Accordingly, it is an object of the present invention to provide an ANI arrangement whereby the two-party test circuitry is located in the outpulser and operates only when a call originates from a two-party line.

It is another object of the present invention to provide an improved automatic calling line identification arrangement which comprises known number network and identifier circuitry.

SUMMARY OF THE INVENTION

In accordance with the principles of the present invention, in one illustrative embodiment thereof, means are provided for automatically identifying the directory number of a calling subscriber. The means include a number network, a bus system and an identifier circuit similar to that disclosed and claimed in the above mentioned Moore et al patent.

After a subscriber has initiated a call, a trunk circuit is connected with the subscriber's line by the switching network and an outpulser circuit is interconnected with the trunk circuit. The trunk circuit, in response to a service request by a calling line, selectively signals number network identification circuitry and identifier circuitry to identify the individual party directory number on a single party line or to initially identify the ring party directory number on a two-party line. The outpulser had previously arranged the number network and the identifier circuitry to initially identify the ring party of any two-party calling line. The number network, in addition to identifying the directory number, also informs the outpulser of the class of service of the calling subscriber's line, i.e., individual party, two-party. If the call originates on a two-party line, the outpulser, comprising two-party test circuitry, has a two-party test made to determine which party initiated the call, while the ring party identification is stored in the outpulser. If the ring party initiated the call the stored identification is used; if the other party (i.e., the tip party) initiated the call, the stored identification is erased and a second identification pulse is sent down the associated sleeve lead to the number network which has now been arranged for other party identification.

Thus a two-party test is made only when a call originates on a two-party line.

It is an aspect of the present invention that the two-party test circuitry performs a simplex test to determine which party has initiated the call. The tip and ring leads of the calling line are simplexed together to determine whether or not ground appears on the line; ground indicates that the tip party initiated the call while an open circuit indicates that the calling party is the ring party.

DESCRIPTION OF THE DRAWINGS

The foregoing objects, features and advantages of the invention will be more apparent from the following description of the drawings in which.

Figure 1:
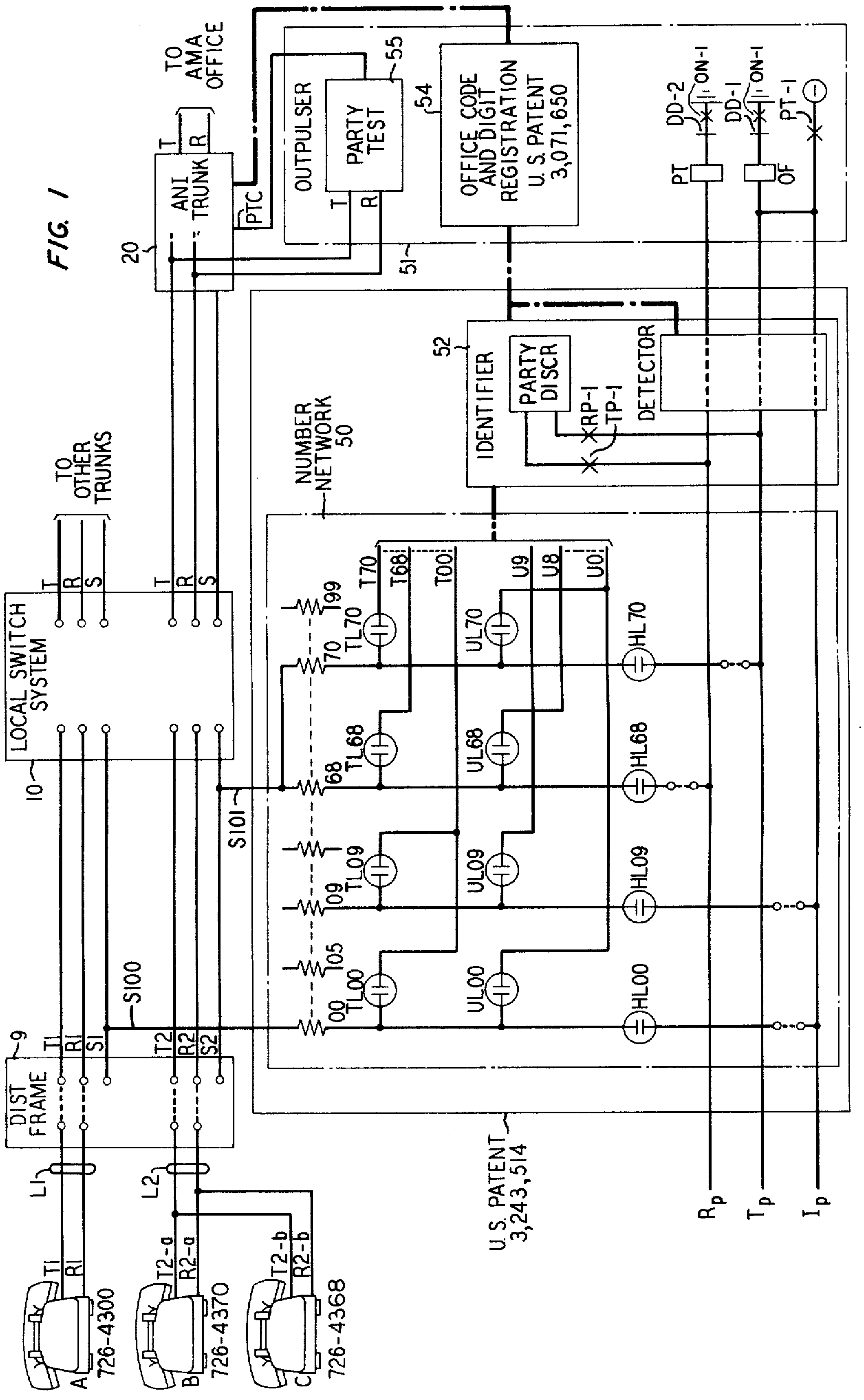
FIG. 1 shows a telephone central office employing the identical number identification arrangement of the present invention.

It will be noted that FIG. 1 employs a type of notation referred to as "detached contact" in which an X shown intersecting a conductor represents a normally open contact of a relay and a bar shown intersecting a conductor at right angles represents a normally closed contact of a relay, "normally" referring to the unoperated condition of the relay. The principles of this type of notation are described in an article entitled "An Improved Detached Contact Type Schematic Circuit Drawing" by F. T. Meyer in the September 1955 publication, *Transactions of the American Institute of The Electrical Engineers, Part* 1, *Communications and Electronics*, Vol. 74, pages 505–513.

GENERAL DESCRIPTION

FIG. 1

It is initially assumed that calling line identification is desired in response to particular service requests on the part of subscribers; it will be understood that this assumption is made merely for purposes of facilitating the description. When a subscriber initiates a call, the local switching system 10 in FIG. 1 is energized in the normal and well-known manner and the call proceeds through the *A*utomatic *N*umber *I*dentification (ANI) outgoing trunk 20 to a remote office, which has *A*utomatic *M*essage *A*ccounting (AMA) equipment for initiating the identification process.

The first step in the identification process occurs when the trunk 20 connects to the outpulser 51. Equipment within outpulser 51 serves to establish a connection to an identifier 52, the latter being connected to a lamp number network such as 50. Outpulser 51 arranges identifier 52 to identify the ring party if the calling party line is a two-party line. The ANI outgoing trunk 20 is then signaled to place a special identification pulse on the sleeve lead of the calling line through the local switching system 10.

After the identification pulse has appeared on the line sleeve terminal corresponding to the calling line, and after having been transmitted thereto through the local switch train, the pulse then traverses the cross-connection in the distributing frame which attaches directory number significance to the calling line. It is to be noted that many contemporary telephone systems exhibit no regular correlation between line sleeve or equipment number terminals and directory number terminals; this being well known, it is readily apparent that a calling line identification system must identify numbers from the directory terminals rather than the line sleeves. Therefore, the identification pulse is transmitted to the particular directory number terminal located on a number network 50 corresponding to the directory number of the calling line.

For example, assume that the calling line L1 is a single party line associated with sleeve S1, which is represented in the lamp network 50 by an individual lamp group connected with a particular directory number terminal. Although the Moore et al arrangement discloses a four lamp number network, the three lamp network described herein operates in the same manner and comprises substantially the same circuit arrangement. Moore et al shows a fourth lamp inserted in series with each of the protection resistors which are located in the upper portion of the number network block 50, FIG. 1. The fourth lamp provides additional voltage isolation which is not required in the present system arrangement. Each lamp group comprises three lamps, for example, in terminal group -00, lamps TL-00, UL-00 and HL-00. The identification pulse energizes the three lamps in the associated number group providing identifier 52 with outputs indicative of the directory number of the calling party. Furthermore, class of service information is provided on the associated bus; in the present example the individual party bus $I_p$ will be energized, indicating that the calling party is on single party line L1.

When the identifier 52 has received this information, it is transmitted to office code and digit registration circuit 54 portion of outpulser 51 from whence it proceeds through the ANI trunk 20 to the AMA office (not shown) where registration takes place.

Party test circuit 55 is arranged to operate only when a call is initiated by a party on a two-party line. Outpulser 51, as described above, arranges identifier 52 to identify a ring party if a call originates on a two-party line. If a ring party identification appears on ring party bus $R_p$, party test circuit 55 is connected with the T and R leads of the calling line to determine whether the tip or ring party has initiated the call. The results of the two-party test causes the ring party identification to be used or the ring party identification to be erased in which case a tip party identification is initiated.

Detailed Description

Figure 2:
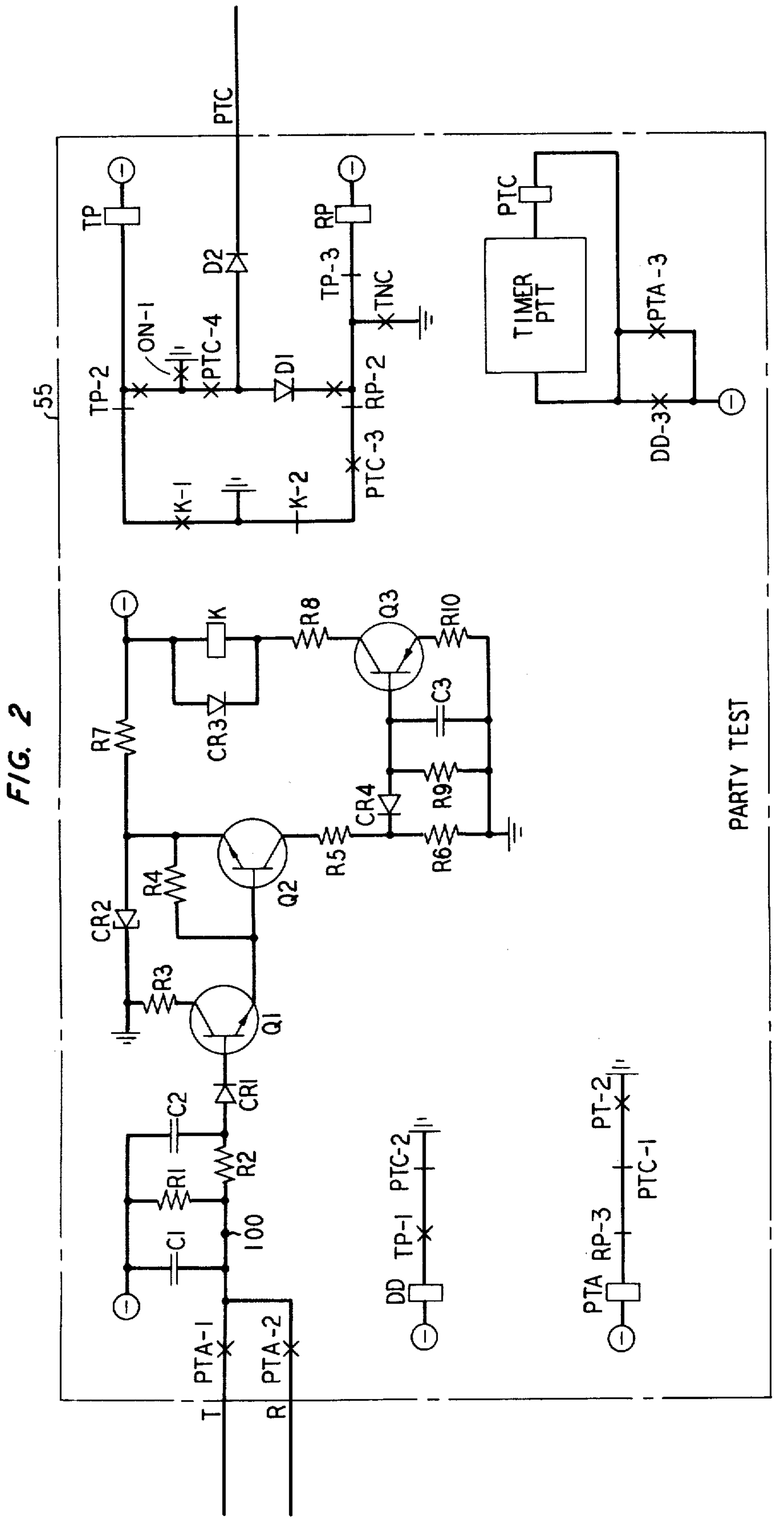
FIG. 2 is a circuit drawing of the two-party test circuit shown in FIG. 1.

FIGS. 1 and 2

Identification of a Calling Subscriber on an Individual Line

After a subscriber has initiated a call, for instance subscriber A on FIG. 1, local switching system 10 interconnects subscriber A with an ANI trunk; i.e., ANI trunk 20, which connects to an Automatic Message Accounting (AMA) office, not shown on the drawing. ANI trunk 20 is also connected with outpulser 51. The seizure of outpulser 51 causes a relay ON (not shown) to operate and close contact ON-1 to ground as shown on FIGS. 1 and 2. After the AMA office signals ANI trunk 20 requesting that an identification of the calling party now be made and sent to the AMA office for billing purposes, ANI trunk 20 operates relay circuitry, not shown, which closes contacts TNC shown on FIG. 2. The closed contact TNC causes ring party relay RP to operate. Battery is now connected through the coil of relay RP, normally closed contact TP-3, and closed contact TNC to ground. Contact RP-1, shown on FIG. 1, in identifier 52 is closed and identifier 52 is arranged to pass on the identity of only a ring party if the call has originated on a two-party line. This arrangement will be described below.

Outpulser 51 signals ANI trunk 20 to send an identification pulse down the sleeve lead associated with the line which has originated the call. In this instance subscriber A has originated the call and the pulse originated by ANI trunk 20 appears on lead S1 associated with subscriber A since the local switching system 10 has interconnected subscriber A and ANI trunk 20. Lead S1 is terminated on distributing frame 9 for association with subscriber's line A and is also interconnected with number network 50 via lead S100.

Number network 50 comprises groups of lamps with each group being individually associated with identifying a particular subscriber's directory telephone number. For example, the connection S100 shown from sleeve lead S1 of the line serving subscriber A, whose directory number is 726-4300, is terminated at directory number terminal 00 on number network 50, FIG. 1. Lamps TL-00, UL-00 and HL-00 are shown connected to terminal 00. These three lamps are all adapted to be energized in response to the appearance of the appropriate identification signal on their common directory number terminal 00.

Number network 50 is also connected with three bus circuits, tip party bus $T_p$, ring party bus $R_p$ and individual party bus $I_p$. Groups of lamps associated with an independent, or a single, party line, for example lamps -00 or -09, are connected with bus $I_p$; groups of lamps associated with a ring party are connected with bus $R_p$ and groups of lamps associated with a tip party are connected with bus $T_p$. Thus an identification pulse appearing at directory number terminal 09 would excite lamps TL-09, UL-09 and HL-09 and would then appear on bus $I_p$ and operate relay OF shown in outpulser 51, FIG. 1. The significance of relaay OF will be explained below.

When relay RP operated, contact RP-1 closed thereby arranging identifier 52 to identify only a ring party on a call originated on a two-party line as stated above. The closing of contact RP-1 connects tip party bus $T_p$, FIG. 1, with party discriminator circuitry in identifier 52. Party discriminator circuitry, as disclosed in the above mentioned Moore et al patent, biases the bus to which it is connected such that the identification lamps interconnected with the bus cannot be excited. Thus the operation of relay RP closes contact RP-1 connecting bus $T_p$ with party discriminator circuitry thereby preventing a tip party identification since the tip party lamps cannot be excited.

In the present example the identification pulse on lead S100 energizes TL-00, UL-00 and HL-00. When the individual lamps are energized, a positive pulse appears on the coupled leads T00 and U0 and the $I_p$ bus. It should be noted that no other group of lamps are energized since the identifying pulse signal appears only on sleeve lead connection S100 and on no other sleeve lead connection. The appearance of an identifying pulse on leads T00 and U0 results in the identification of the tens and units digits of subscriber A's directory number by the identifier, in this example digits 00 of subscriber's directory number 726-4300. When lamp HL-00 is energized, an identification pulse appears on bus $I_p$ and this identifies the hundreds and thousands digits of the subscriber's number, in this example digits 43 of subscriber's directory number 726-4300 and also operates office relay OF.

Identifier 52 transforms the identification information received from number network 50 into a two-out-of-five code relating to the units, tens, hundreds and thousands digits of the directory number of the calling subscriber in a manner well-known in the art, see, for example, the above mentioned Moore et al patent. The two-out-of-five coded identification information is stored in the office code and digit registration circuit 54 of outpulser 51. Office code and digit registration circuit 54 may comprise any well-known relay or solid state storage arrangement already well-known in the art, see, for example, U.S. Pat. No. 3,071,650 issued to Cahill et al on Jan. 1, 1963.

Concurrently with storing the thousands, hundreds, tens and unit digits in the office code and digit registration circuit 54, relay OF, which was operated by a pulse on bus $I_p$, registers the first three digits of the calling number in office code and digit registration circuit 54. These three digits are known as the office code and in the present example, the office code of the calling subscriber A is 726. Subscriber A's directory number 726-4300 has, therefore, been uniquely identified and stored in the outpulser 51.

Although the present embodiment only shows one OF relay, it is readily apparent that more than one OF relay can be used where more than one set of office codes is used for subscriber's numbers.

When all seven digits of the subscriber's number have been stored in office code and digit registration circuit 54, party test circuit 55 is signaled that the identification is complete and contact TNC is opened thereby releasing ring party relay RP. The significance of releasing relay RP will be discussed below.

The information stored in office code and digit registration circuit 54 is then transmitted via ANI trunk 20 to the AMA office for billing purposes.

Identification of the Calling Subscriber on a Two-Party Line

Although the use of two-party lines in telephone systems is becoming less and less widespread, most small central dial offices still service a number of two-party lines and it is therefore imperative that any system for automatically identifying a calling line be able to automatically identify which party of a two-party line initiates a call. FIG. 1 shows a two-party line L2 servicing subscribers B and C. It is to be assumed that subscriber B is a tip party and subscriber C is a ring party. The tip party station subset connects a first predetermined condition, i.e., ground through a winding of the ringer when requesting service, i.e., an off-hook condition. A second predetermined condition, i.e., the absence of ground or substantially an open circuit is used to identify a ring party station subset when requesting service. As a result, party test circuitry detecting a resistance to ground on the two-party line interprets the call as being originated by the tip party, while the absence of ground on the line indicates that the call is being originated by the ring party. This type of arrangement is well-known in the art and is described in U.S. Pat. No. 2,355,207, issued to J. W. Dehn on Aug. 8, 1944.

It is assumed that subscriber B, the tip party, has initiated a call and that calling line L2 has been connected by local switching system 10 to the ANI trunk 20. As with the initiation of a call from a line serving an individual party such as L1 described above, the AMA office signals ANI trunk 20 requesting the number of the calling party and this signal operates relay circuitry within ANI trunk 20 which causes outpulser 51 to close contact TNC causing ring party relay RP to operate. As described above, the operation of relay RP causes contact RP-1, shown in identifier 52 of FIG. 1 to close. Thus identifier 52 is arranged to identify a ring party if the call has been originated by a party on a two-party line.

ANI trunk 20 now sends an identification pulse on lead S2 associated with calling line L2, which identification pulse appears on lead S101 and at directory number terminals 68 and 70 of number network 50. Number network 50 shows two sets of identification lamps interconnected with lead S101 since lead S101 is connected to line L2 which is a two-party line. However, the operation of relay RP closes contact RP-1 in identifier 52 which back biases bus $T_p$ and which allows only the identification lamps associated with ring party bus $R_p$ to be ignited and detected by identifier 52. Thus, although the identification pulse appears at lamps associated with terminals 68 and 70 on number network 50, only those lamps interconnected with the ring party bus will be ignited and detected. Lamps HL-68, TL-68 and UL-68 connected with directory number terminal 68 are now ignited and the pulse appears on ring party bus $R_p$ which operates relay PT shown as part of outpulser 51.

As described above, the identification pulse appearing at an individual group of lamps causes identifier 52 to register the associated digits in digit and registration circuit 54. Furthermore, the operation of relay PT also causes relay OF to operate, battery is connected through closed contact PT-1, the coil of relay OF, closed contact DD-1 to ground, thus registering the office code associated with the calling party in office code and digit registration circuit 54. In the present example, lamps TL-70, UL-70 and HL-70 are ignited and a pulse is superimposed on the associated leads to identifier circuit 52, while concurrently relay OF operates, causing the ring party's number, 726-4368, to be stored in office code and digit registration circuit 54 located in outpulser 51. However, it was assumed that the tip party, subscriber B having a directory number 726-4370, had initiated the call. Thus, momentarily, the wrong directory number has been stored in outpulser 51.

As described earlier, when identification has been successfully completed and seven digits stored in office code and digit registration circuit 54, contact TNC is opened thereby removing ground from the coil of ring party relay RP. The release of ring party relay RP permits two-party test circuit 55 to operate on calls originating from two-party lines, as will now be described in detail.

The identification pulse on bus $R_p$ operates party test relay PT located in outpulser 51, FIG. 1. The operation of relay PT closes contact PT-2 which causes relay PTA, FIG. 2, to operate by connecting ground through closed contacts RP-3 and PTC-1 to the coil of relay PTA. The operation of relay PTA causes two circuits to operate. First, contacts PTA-1 and PTA-2, FIG. 2, are closed connecting party test circuit 55, FIG. 2, with the tip and ring leads, T and R, of the calling line, L2, FIG. 1. Since subscriber B, the calling party, is a tip party, ground is connected with the off-hook subscriber subset, as described above. The ground now appears at point 100 on FIG. 2 to operate relay K as subsequently described.

Resistor R1 and the attached resistance ground provided by the tip party ground from a voltage divider. When the input voltage at point 100 is greater than the negative bias potential provided by zener diode CR2, diode CR1 and transistors Q1 and Q2 are biased on. Resistor R1 has a high resistance value to limit the current into the base of Q1, thus, only a small amount, i.e., 5 to 10 microamperes, of Q1 base current is required to turn on transistor Q1. Capacitors C1 and C2 integrate the input signal and provide alternating current immunity by slowing the response time of the input. Resistors R3 and R4 control bias voltage and current for transistors Q1 and Q2. Resistor R7 controls the current flowing through zener diode CR2.

With transistor Q2 turned on in response to the ground on terminal 100, the voltage divider formed by resistor R5 and the parallel combination of resistors R6, R9 and diode CR4 provides a negative bias voltage to turn on transistor Q3. Capacitor C3 slows the signal rise time at the base of transistor Q3 to provide further alternating current immunity.

Once Q3 is turned on, if transistors Q1 and Q2 are turned off by an unwanted momentary signal appearing on line L2, transistor Q3 will not be turned off since capacitor C3 will discharge through the base of transistor Q3 and resistor R9. Diode CR4 prevents discharge current from flowing through resistor R6, thus slowing the turn off of transistor Q3. Thus, an unwanted low frequency alternating current signal is prevented from turning off the two-party test circuit 55.

When transistor Q3 is turned on, it provides current to operate relay K. Resistor R10 provides temperature compensation for transistor Q3 by stabilizing the emitter voltage. Resistor R8 limits the current flow through the transistor Q3. Diode CR3 provides transient protection for transistor Q3 when relay K releases.

The operation of relay K causes contact K-1 to close and contact K-2 to open, thereby operating the tip party relay, designated TP on FIG. 2, by connecting battery through the coil of relay TP and make contact K-1 to ground.

Components R6, R9, C3, R10 and CR4 are connected in the base-emitter circuit of Q3 to prevent the circuit from being damaged or inadvertently turned on by longitudinal noise signals appearing on the T and R leads of the interconnected calling line.

The operation of relay TP closes contact TP-1 which causes relay DD, FIG. 2, to operate. Operation of relay DD erases the information stored in the office code and digit registration circuit 54 in a manner well-known in the art, i.e., removing ground from a registration circuit comprising relay circuitry. Additionally, as long as there are no digits stored in the digit registration circuit 54, ANI trunk 20 cannot outpulse information to the AMA office. Furthermore, the operation of relay DD releases party test relay PT and relay OF through the operation of break contacts DD-2 and DD-1, respectively. When relay PT releases, contact PT-2, FIG. 2, opens, releasing relay PTA and disconnecting party test circuit 55 from line L2 since contacts PTA-1 and PTA-2 are now open. Also, with relay DD operated, timer PTT will operate through contact DD-3, FIG. 2. Thus the operation of relay DD and closing contact DD-3 assures that timer PTT operates even if relay PTA prematurely releases.

The second circuit operated by relay PTA is timer circuit PTT, FIG. 2, which operates when contact PTA-3 closes. Timer circuit PTT can be any timer arrangement well-known in the art and in the present arrangement comprises a 90 millisecond timing sequence. When contact PTA-3 or contact DD-3 closes, timer circuit PTT will, 90 milliseconds later, operate relay PTC, FIG. 2. As seen on FIG. 2, the operation of relay PTC disconnects relay PTA from ground through the operation of break contact PTC-1, prohibits relay DD from operating or releases relay DD because of break contact PTC-2, and closes contact PTC-3 which will cause relay RP to operate if relay TP has not operated. Thus, timer circuit PTT allows party test circuit 55 90 milliseconds to determine whether the tip or ring party has initiated the call.

As described above, if the tip party has initiated the call, relay TP operates, which in turn operates relay DD thereby erasing the stored digits in the outpulser 51 and preventing ANI trunk 20 from outpulsing. If, however, it is assumed that the ring party, subscriber C, has initiated the call, ground does not appear at terminal 100 of the party test circuit, FIG. 2, and transistors Q1, Q2 and Q3 are not turned on. Therefore relay K does not operate and tip party relay TP also does not operate. Ninety milliseconds after relay PTA has operated, timer circuit PTT operates relay PTC, closing contact PTC-3, thereby connecting ground through contacts K-2, PTC-3, RP-2 and TP-3 to the coil of ring party relay RP which now operates. Furthermore, as described above, the PTA relay is disconnected from ground by the operation of break contacts PTC-1 and RP3. The DD relay is prohibited from operating by break contact PTC-2. Thus the directory numbers stored in office code and digit registration 54 are not erased since the ring party initiated the call and the ring party's directory telephone number is stored. Coincident with the operation of ring party relay RP a signal is transmitted from ground, through contact PTC-4 and diode D2 on lead PTC to ANI trunk 20 indicating that outpulser 51 is already to transmit the directory number of the calling ring party. Since relay DD was not operated and the directory number is stored, ANI trunk 20 is arranged to outpulse. Thus if it were assumed that the calling party was the ring party, party C, the ring party identification is now complete and the stored directory number is ready to be transmitted to the AMA office.

However, it was originally assumed that subscriber B, the tip party on line L2, originated the call and, to summarize briefly, line L2 is connected by local switching system 10 to ANI trunk 20. After being interconnected with an AMA office and outpulser 51, ANI trunk 20 operates relay circuitry to identify the ring party whenever a call has originated on a two-party line and then to transmit an identification pulse down the sleeve lead associated with the calling line. The identification pulse triggers a set of three lamps located in number network 50 which are interconnected with a directory number terminal associated with the particular sleeve lead. The pulse excites the three lamps associated with the ring bus since an initial ring party identification is always arranged by ANI trunk 20 on calls from two-party lines. Identifier 52 and office relay OF, which are energized by the identification pulse, operate to store the office code and digit registration of the ring party in the office code and digit registration circuit 54 and to release the ring party relay RP. Concurrently, party test relay PT operates to cause party test circuit 55 to be connected with leads T and R of the calling line L2. A party test is performed which results in tip party relay TP operating to indicate that the calling party is the tip party. Relay TP operates relay DD which causes the stored telephone directory number of the ring party to be erased from the outpulser and prevents ANI trunk 20 from outpulsing. Thus outpulser 51 now has no directory number stored in office code and digit registration circuit 54.

Outpulser 51 at this time has operated tip party relay TP which has closed contact TP-1, FIG. 1, and prepares identifier 52 to receive only a tip party identification on bus $T_p$. Since 90 milliseconds has elapsed since relay PTA operated, timer PTT operates relay PTC which disconnects relays PTA and DD from ground through the operation of break contacts PTC-1 and PTC-2, respectively. It should be noted that the operation of relay PTC, after relay TP has operated, does not cause relay RP to operate since break contact TP-3 prevents relay RP from being connected to ground. Thus outpulser 51 is arranged to store the identification of the calling tip party and has prepared identifier 52 to identify a tip party.

Without a directory number stored in the office code and digit registration circuit 54, the operation of relay PTC and release of relay DD causes a signal to be sent to ANI trunk 20 which informs ANI trunk 20 over lead PTC that the identification is not complete. This signal also causes ANI trunk 20 to superimpose a second identification pulse on the sleeve lead associated with calling line L2.

The second identification pulse superimposed on sleeve lead S2 by ANI trunk 20 reacts with number network 50 in the same manner as the first identification pulse described above, except on this occasion lamps TL-68, UL-70 and HL-70 interconnected with tip party bus $T_p$ are excited. Identifier 52 translates the pulses received from number network 50 into digit information for registration in office code and digit registration circuit 54. Simultaneously, relay OF is operated by a pulse on bus $T_p$ and the office code of the calling party is generated for storage. Thus the directory number 726-4370 is now stored in the office code and digit registration circuit 54. Party test relay PT is not operated during this sequence since it is connected with ring party bus $R_p$ thus not allowing relay DD to operate.

Since the directory number of the calling party is now stored in office code and digit registration circuit 54, outpulser 51 via the operation of relay PTC, as described above, signals ANI trunk 20 that identification is complete and it can begin outpulsing the stored directory number to the AMA office.

After outpulsing is complete, the outpulser 51 is disconnected and the off-normal relay ON (not shown) is released causing contact ON-1 to break ground in order to release relays TP, RP, and OF (if operated). The outpulser 51 is now ready for seizure by another call.

What is claimed is:

1. In a telephone system having an AMA office and a local office, said local office comprising:

- a plurality of two-party lines,
- means operative upon a service request from either party on a two-party line for identifying the directory number of a first party on said two-party line,
- an outpulser,
- means in said outpulser responsive to said first party directory number identification for determining whether said first party or the second party on said two-party line is requesting service,
- means in said outpulser operative upon said determination by said determining means for outpulsing said first party directory number to said AMA office when said first party is requesting service,
- means operative upon said determination by said determining means for identifying the directory number of said second party when said second party is requesting service, and
- means in said outpulser responsive to said second party directory number identification for outpulsing said second party directory number to said AMA office.

2. The system of claim 1 wherein said outpulser further comprises:

- storage means operative upon said first party directory number identification for storing the directory number of said first party and
- means operative upon said second party directory number identification for erasing said stored first party directory number and for entering the directory number of said second party in said storage means.

3. The system of claim 1 wherein said two-party line comprises means for applying a first predetermined electrical signal to said line when said first party is requesting service and means for applying a second predetermined electrical signal to said line when said second party is requesting service; and

- said determining means comprises transistor circuitry interconnected with said two-party line, said transistor circuitry being responsive to said second predetermined electrical signal on said line for activating said second party directory number identifying means.

4. In a telephone system central office, a plurality of lines including two-party lines, outpulser circuits, trunk circuits, means for connecting a calling one of said lines to a trunk circuit, means interconnected with said lines for identifying the directory number and class of service of a party on said calling line, said number being the directory number of a first party when said calling line is a two-party line, means in said connected trunk circuit for signaling said identifying means to identify the directory number and class of service of said party on said calling line, and means for connecting an outpulser circuit to said connected trunk circuit, said outpulser circuit comprising:

means responsive to said directory number identification for storing said directory number of said party on said calling line, testing means operative upon said class of service indication that said calling line is a two-party line for determining whether said first party or the second party is the calling party on said line, means operative upon the determination by said testing means that said second party is said calling party for erasing said directory number in said storage means, said signaling means being responsive to said erasure for applying a second signal to said identifying means, said identifying means being responsive to said second signal application for identifying the directory number of said second party, and means operative upon said second party directory number identification for storing said second party directory number in said storage means.

5. The system of claim 4 further comprising means for applying a first electrical signal to said line when said first party is requesting service and means for applying a second electrical signal to said line when said second party is requesting service; and said testing means comprises transistor circuitry responsive to said second electrical signal application for activating said signaling means to apply said second signal to said identifying means.

6. In a telephone office having a calling line identification arrangement for identifying the directory number of the calling party on a two-party line:

means for identifying the directory number of either party on said two-party line, means responsive to a service request by said calling party for energizing said identifying means to identify the directory number of a first party on said line, an outpulser, means in said outpulser responsive to said first party directory number identification for storing said first party directory number, testing means in said outpulser responsive to said first party directory number identification for determining whether said first party or the second party is said calling party, means operative upon a determination by said testing means that said second party is said calling party for erasing said first party directory number in said storage means and for energizing said identifying means to identify the directory number of said second party, and means responsive to said first party directory number erasure for storing said second party directory number in said storage means.

7. In a telephone switching system having an AMA office, a local office and a trunk interconnecting said local office with said AMA office, said local office having two-party identification facilities comprising:

means responsive to a call originating on a two-party line in said local office for generating the directory number of a first party on said two-party line, an outpulser circuit, storage means in said outpulser circuit, means responsive to said first party directory number generation for storing said first party directory number in said storage means, means in said outpulser responsive to said storing means for determining whether said first party or the second party is the calling party on said two-party line, means responsive to said determination by said determining means for extending said first party directory number from said storage means over said trunk to said AMA office when said first party is said calling party, means responsive to said determination by said determining means for generating the directory number of said second party when said second party is said calling party, means responsive to said second party directory number generation for erasing said first party directory number in said storage means, means operative upon said first party directory number erasure for storing said second party directory number in said storage means, and means responsive to said second party directory number storage for extending said second party directory number from said storage means over said trunk to said AMA office.

8. The system of claim 7 wherein said determining means comprises:

means responsive to said first party being said calling party for applying a first unique signal to said line, means responsive to said second party being said calling party for applying a second unique signal to said line, a testing circuit, means operative upon said first unique signal application for extending said first unique signal to said testing circuit, means operative upon said second unique signal application for extending said second unique signal to said testing circuit, and said testing circuit being responsive to said extended second unique signal for activating said means for generating the directory number of said second party.

9. The method of identifying the calling party on a two-party line in a telephone system having an AMA office, a local office, and a trunk interconnecting said local office with said AMA office, said method comprising the steps of:

generating the directory number of a first party for a call originating on a two-party line in said local office, storing said first party number in a storage means of an outpulser circuit, determining whether said first party or the second party on said two-party line is the calling party, extending said first party number from said storage means over said trunk to said AMA office when the calling party is determined to be said first party, generating the directory number of said second party when the calling party is determined to be said second party, erasing the first party number from said storage means in response to said second party number generation, storing said second party number in said storage means in response to said erasure, and extending said second party number from said storage means over said trunk to said AMA office in response to said second party number storage.

10. The method of identifying the calling party on a two-party line in a telephony system having an AMA office, a local office, and a trunk interconnecting said local office with said AMA office, said method comprising the steps of:

applying a first unique signal to a two-party line when a first party on said line requests service, applying a second unique signal to said line when the second party on said line requests service, identifying the directory number of the first party when either the first or second party requests service, storing the directory number of the first party in storage means of an outpulser in response to the first party number identification, extending said first party directory number from said storage means over said trunk to said AMA office in response to said first unique signal application on said line, generating the directory number of said second party in response to said second unique signal application on said line, erasing the first party number in said storage means in response to the generation of the second party directory number, storing the second party directory number in said storage means in response to the said erasure, and extending the second party directory number from said storage means over said trunk to said AMA office in response to said second party directory number storage.

* * * * *

UNITED STATES PATENT AND TRADEMARK OFFICE

CERTIFICATE OF CORRECTION

PATENT NO. : 3,922,498

DATED : November 25, 1975

INVENTOR(S) : Guy Darrell Aul, James Russell Ballard, and Roger Alan Fraser

It is certified that error appears in the above-identified patent and that said Letters Patent are hereby corrected as shown below:

On the front page of the patent, the assignee "Bell Telephone Laboratories, Incorporated, Murray Hill, N.J." should read --Western Electric Company, Incorporated, New York, N.Y.--. Column 5, line 6, "relaay" should read --relay--; line 22, "energizes TL-00" should read --energizes lamps TL-00--. Column 7, line 5, "TL-70, UL-70, and HL-70" should read --TL-68, UL-68, and HL-68--; line 38, "from" should read --form--. Column 8, line 66, "RP3" should read --RP-3--. Column 9, line 6, "already" should read --ready--. Column 10, line 2, "TL-68" should read --TL-70--. Column 12, line 8, "telephone" should read --telephony--.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*